(12) United States Patent
Rabbat et al.

(10) Patent No.: US 11,205,460 B2
(45) Date of Patent: *Dec. 21, 2021

(54) PRERECORDED VIDEO EXPERIENCE CONTAINER

(71) Applicant: Gfycat, Inc., Palo Alto, CA (US)

(72) Inventors: Richard Rabbat, Palo Alto, CA (US); Ernestine Fu, Northridge, CA (US)

(73) Assignee: Gfycat, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,372

(22) Filed: Jun. 18, 2020

(65) Prior Publication Data

US 2020/0342910 A1 Oct. 29, 2020

Related U.S. Application Data

(63) Continuation of application No. 15/962,979, filed on Apr. 25, 2018, now Pat. No. 10,699,748.

(51) Int. Cl.
*G11B 27/036* (2006.01)
*H04N 5/775* (2006.01)
*G06F 3/0484* (2013.01)

(52) U.S. Cl.
CPC ........ *G11B 27/036* (2013.01); *G06F 3/04842* (2013.01); *H04N 5/775* (2013.01)

(58) Field of Classification Search
CPC .... G11B 27/036; G06F 3/04842; H04N 5/775
See application file for complete search history.

(56) References Cited

U.S. PATENT DOCUMENTS

| 10,699,748 B2 | 6/2020 | Rabbat et al. |
| 2010/0031367 A1 | 2/2010 | Leonard et al. |
| 2012/0327265 A1* | 12/2012 | Arujunan ........... H04N 1/00164 348/231.3 |

(Continued)

OTHER PUBLICATIONS

"U.S. Appl. No. 15/962,979, Final Office Action dated Dec. 27, 2019", 42 pgs.

(Continued)

*Primary Examiner* — Thai Q Tran
*Assistant Examiner* — Jose M Mesa
(74) *Attorney, Agent, or Firm* — Schwegman Lundberg & Woessner, P.A.

(57) ABSTRACT

A computer readable storage medium has stored thereon a prerecorded video experience container. The prerecorded video experience container includes a prerecorded video file that displays visual content, an executable experience which upon execution enables presentation of additional content associated with the prerecorded video file, and an interactive region of the prerecorded video file, wherein the interactive region of the prerecorded video file is associated with the executable experience such that a user interaction with the interactive region executes the executable experience. The prerecorded video file is displayed in response to a selection of the prerecorded video experience container. The executable experience associated with the prerecorded video file is executed in response to identifying an interaction with the interactive region. The additional content associated with the prerecorded video file is displayed in response to executing the executable experience.

20 Claims, 10 Drawing Sheets

(56) References Cited

U.S. PATENT DOCUMENTS

| | | |
|---|---|---|
| 2014/0018601 A1 | 7/2014 | Guckenberger et al. |
| 2015/0248722 A1 | 9/2015 | Malak et al. |
| 2017/0257414 A1* | 9/2017 | Zaletel .................. G06F 16/252 |
| 2018/0227339 A1* | 8/2018 | Rodriguez .......... H04L 65/1089 |
| 2019/0333539 A1 | 10/2019 | Rabbat et al. |

OTHER PUBLICATIONS

"U.S. Appl. No. 15/962,979, Non Final Office Action dated Jul. 26, 2019", 26 pgs.

"U.S. Appl. No. 15/962,979, Notice of Allowability dated May 28, 2020", 2 pgs.

"U.S. Appl. No. 15/962,979, Notice of Allowance dated Apr. 29, 2020", 5 pgs.

"U.S. Appl. No. 15/962,979, Response filed Mar. 27, 2020 to Final Office Action dated Dec. 27, 2019", 19 pgs.

"U.S. Appl. No. 15/962,979, Response filed Nov. 1, 2019 to Non Final Office Action dated Jul. 26, 2019", 17 pgs.

\* cited by examiner

PRERECORDED VIDEO EXPERIENCE CONTAINER

CLAIM OF PRIORITY

This application is a continuation of, and claims the benefit of priority to U.S. patent application Ser. No. 15/962,979, filed on Apr. 25, 2018 and issued as U.S. Pat. No. 10,699,748 on Jun. 30, 2020, which is incorporated herein by reference in its entirety.

BACKGROUND

Media files, such as audio and video files, are used in a variety of environments for conveying many types of information. For example, media files can be streamed or otherwise communicated over computer networks, allowing users to view and/or listen to the media content. Conventionally, video content is a one-directional medium such that a content provider provides the video content to a user for viewing. With the advent of the Internet, the amount of video content available to users has grown exponentially, as has the media platforms upon which the video content is available for viewing. Some media platforms have attempted to provide some forms of interactivity with video content. However, conventional interactive video content suffers from many significant shortcomings.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
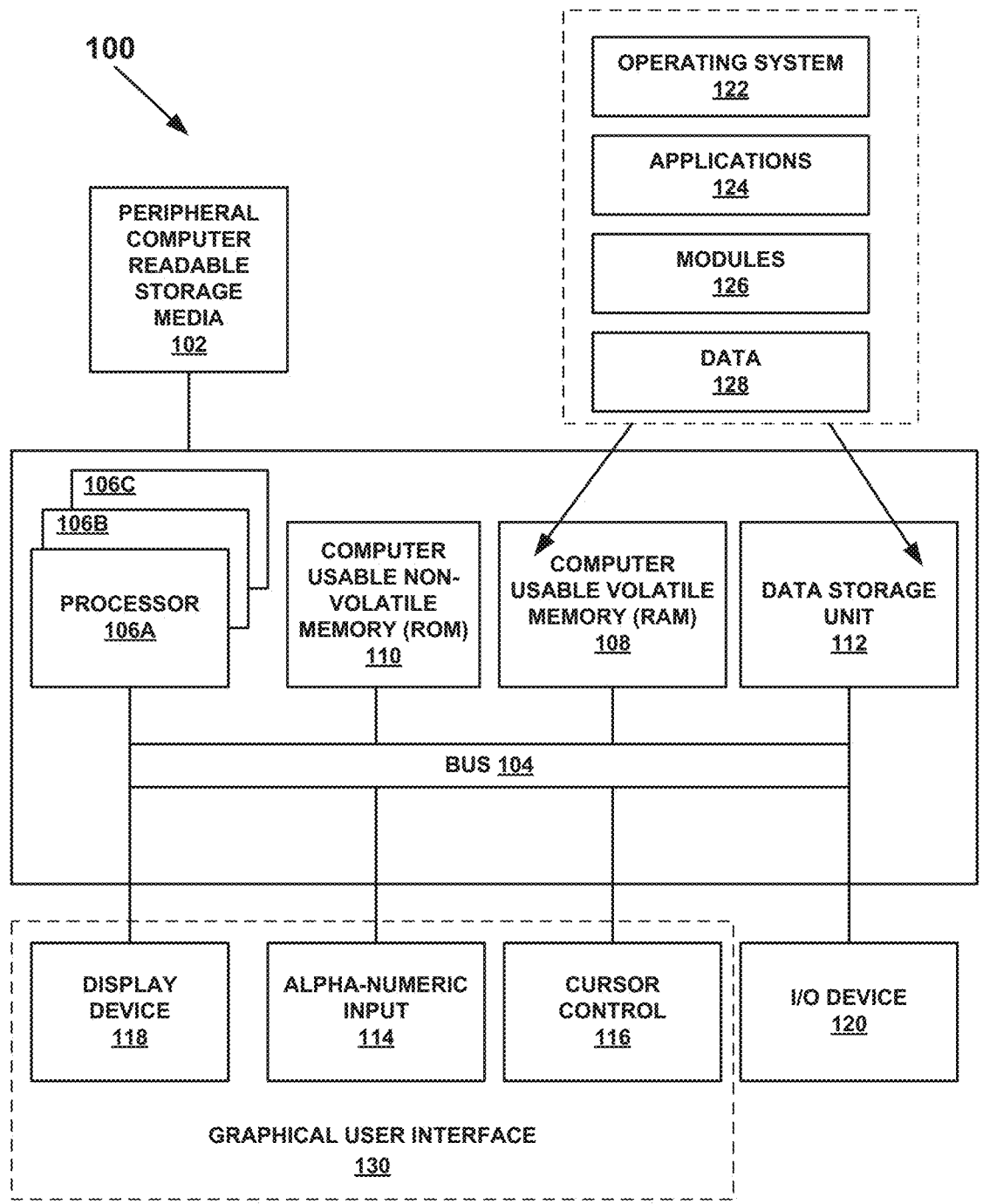
FIG. 1 illustrates an example computer system upon which embodiments described herein be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying," "receiving," "assembling," "displaying," "executing," "determining," "using," "accessing," "selecting," "customizing," or the like, refer to the actions and processes of an electronic device such as: a processor, a processor, an optical sensor, a sensor, a memory, a mobile electronic device, a sensor processing unit, a sensor processor, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Examples of a prerecorded video experience container and systems for creating and using a prerecorded video experience container are then described. Example operations of creating looping prerecorded video experience container are then described. Example operations of using a looping prerecorded video experience container are then described.

In accordance with various embodiments, methods and systems for creating and using a prerecorded video experience container are provided. In one embodiment, in a method for creating a prerecorded video experience container, a prerecorded video file that displays visual content is received. In one embodiment, the prerecorded video file is a looping prerecorded video file. An executable experience associated with the prerecorded video file is received, wherein the executable experience upon execution enables presentation of additional content associated with the prerecorded video file. Identification of an interactive region of the prerecorded video file is received, wherein the interactive region of the prerecorded video file is associated with the executable experience such that a user interaction with the interactive region executes the executable experience. The prerecorded video file, the executable experience, and the interactive region, are assembled into a prerecorded video experience container, wherein the prerecorded video experience container, when executed at an electronic device, displays the prerecorded video file and, responsive to identifying an interaction with the interactive region, executes the executable experience.

In some embodiments, a computer readable storage medium has stored thereon a prerecorded video experience container. The prerecorded video experience container includes a prerecorded video file that displays visual content, an executable experience which upon execution enables presentation of additional content associated with the prerecorded video file, and an interactive region of the prerecorded video file, wherein the interactive region of the prerecorded video file is associated with the executable experience such that a user interaction with the interactive region executes the executable experience. The prerecorded video file is displayed in response to a selection of the prerecorded video experience container. The executable experience associated with the prerecorded video file is executed in response to identifying an interaction with the interactive region. The additional content associated with the prerecorded video file is displayed in response to executing the executable experience.

Video content is a useful medium by which to convey visual information to a user. Conventionally, video content is a one-directional medium such that a content provider provides the video content to a user for viewing. With the advent of the Internet, the amount of video content available to users has grown exponentially, as has the media platforms upon which the video content is available for viewing. Some media platforms have attempted to provide some forms of interactivity with video content. However, conventional interactive video content suffers from many significant shortcomings.

For instance, conventional interactive video content is typically platform dependent. The creation of such conventional interactive video content requires that the content be tailored to the particular platform upon which the content is to be played and presented. For each platform that a content provider desires to provide interactive video content, a different version of the same interactive content must be created. As such, creating multiple versions of the same interactive content for presentation on different platforms requires duplicative work, increasing computing resource requirements, labor, costs, and time. Also, for each platform for which interactive video content is created, knowledge of the operations of each platform is required. As such, conventional interactive video content creation tends to be ad hoc and piecemeal, as well as proprietary, as there is no complete solution available. As the number of platforms with substantial user bases is large and increasing, the costs associated with generating interactive video content will continue to grow.

Moreover, conventional interactive video content is generally for presentation within the platform for which it is created. In other words, conventional interactive video content is not freely transportable or usable outside of the platforms used for its creation. Not only must content creators create the interactive video content for multiple platforms, users must have access to or execute a platform for which the interactive video content was created to access and/or interact with the interactive video content. These limitations are significant in reaching desired users of the interactive video content. Moreover, if interactive video content is created for a single user or a group of users, all users must have access to the platform for which the interactive video content is created. Such limitations on the access to interactive content place technical limitations on the impacted users, requiring users to locate and/or install particular applications on computing devices for accessing the interactive content.

Furthermore, conventional interactive video content is typically rudimentary in the type of interactivity provided. For example, while interacting with a piece of video content (e.g., by clicking on the video content via a mouse), a user may be directed to a website, the video content itself includes no information regarding the control, presentation, or customization of any additional content. Any customization, if available, is under the control of the platform for which the content was created, and is not directly related to the video content itself. In particular, the customization is only applicable to the platform for which the content was created.

Various embodiments described herein provide a transportable prerecorded video experience container that includes a looping prerecorded video file and an executable experience in a single container for an improved solution of providing interactive video content. The prerecorded video experience container is platform agnostic, and can provide interactivity without requiring access to a particular platform or application. This improves the efficiency and usefulness of interactive video content by providing a transportable prerecorded video experience container including the executable experience for presenting additional content related to the looping prerecorded video. The prerecorded video experience container is transportable over any communication medium, and can be used in concert with many different applications, without requiring a particular platform. In particular, embodiments described herein provide a platform agnostic solution for providing interactive video content. In various embodiments, the prerecorded video experience container is freely transmissible (e.g., via email, messaging applications, web pages, social networks, etc.)

The prerecorded video experience container described herein includes a video file, an executable experience associated with the video file, and information enabling interactivity of the video file for enabling the executable experience within a single container (e.g., a software container or a software package). The prerecorded video experience container is transmissible through any networked transmission medium, and can include and/or execute applications in response to the interactivity. For example, the prerecorded video experience container can be sent as an email attachment, can be sent as an attachment within a messaging application (e.g., Apple's iMessage, Android Messages, Facebook Messenger, etc.), or can be imbedded within a web page or web application (e.g., as an Iframe).

Embodiments described herein provide for the creation of a prerecorded video experience container. A prerecorded video file displaying visual content is received. In some embodiments, the prerecorded video file is received from a library of prerecorded video files (e.g., maintained by a service hosting prerecorded video files) over a network connection. In other embodiments, the prerecorded video file is located on a local computer. It should be appreciated that the prerecorded video file can be received from any source, and can have any creator. In some embodiments, the prerecorded video file is a looping video file (e.g., automatically restarts after completing a playback). The looping functionality can be implemented within the prerecorded video file itself, within a prerecorded video experience container, or within another application on the playback device. Moreover, it should be appreciated that the prerecorded video file can be any length. In some embodiments, e.g., where the prerecorded video file is looping, the prerecorded video file is less than 30 seconds in length.

Embodiments described herein pertain to prerecorded video experience container including a prerecorded video file. In one embodiment, the prerecorded video file is a Graphics Interchange Format (GIF) file. While embodiments described herein pertain to GIF files, it should be appreciated that other types of prerecorded media files, such as other types of video files, can be used herein. Moreover, it should be appreciated that any type of video file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that the prerecorded media file can be looped (e.g., via a HTML 5 video element or Flash video element) to automatically repeat.

The prerecorded video experience container also includes an executable experience associated with the prerecorded video file. The executable experience provides for the presentation of additional content associated with the prerecorded video file. The executable experience may include one or more media files, applications, instructions for executing an application, and instructions for controlling operation of an application. Example media files include, without limitation: video files, audio files, images, e-books, etc. Example applications include games, media players (e.g., for playing a media file of the executable experience), web applications, etc. Example instructions for executing an application include instructions to execute a messaging application, a media player application, a web browser, etc. Example instructions for controlling operation of an application include commands for interacting with a media player, web application. It should be appreciated that the prerecorded video experience container can include any number of executable experiences that are executable responsive to interactions with different interactive regions of the rendered prerecorded video file, or responsive to other customization factors.

An executable experience is executed in response to a user interaction with the prerecorded video file during playback. An interaction can include a cursor selection, a finger touch (e.g., at a touch screen display), gestures, etc. In some embodiments, at least one interactive region on the rendered prerecorded video file is defined and included within the prerecorded video experience container. An interactive region overlays or is superimposed over the prerecorded video file during playback and defines areas of the display for receiving the interactions. Any number of interactive regions can be defined for a prerecorded video file. In some embodiments, different interactive regions are for executing different executable experiences. An interactive region or regions can be superimposed over an entire rendered prerecorded video file, or an interactive region or regions can be superimposed over a portion of the rendered prerecorded video file, leaving non-interactive portions of the rendered prerecorded video file.

In some embodiments, the prerecorded video experience container also includes at least one customization factor associated with the executable experience, wherein the at least one customization factor customizes the additional content upon execution of the executable experience. The customization factor can include at least one of, without limitation: a location, a user, a time day, and a date. For instance, where a prerecorded video experience container can includes more than one executable experience, a particular executable experience can be selected for presentation partly based on the customization factor. For example, a particular executable experience can be presented based on a time of day (e.g., based on a system clock of the rendering electronic device). A prerecorded video experience container can include two prerecorded video files, one for rendering during a first time period (e.g., 9:00 AM through 5:00 PM), and a second for rendering during a second time period (e.g., 5:00 PM through 9:00 AM). As described below, the customization factors can be used to tailor the presentation of additional content according to day, date, time, location, users, etc.

In some embodiments, the executable experience is tailored by accessing a user profile of the user operating the rendering electronic device. The user profile can stored on the electronic device, or accessed via the electronic device. The user profile can include various types of identifying information of various granularities, including without limitation: age, birthdate, gender, interests, race/ethnicity, language spoken/understood, etc. In various embodiments, a prerecorded video experience container can include a plurality of executable experiences, where an interaction with the prerecorded video file causes presentation of one of the executable experiences based on the user profile.

Embodiments described herein provide a prerecorded video experience container that is self-contained and transmittable. The prerecorded video experience container includes all information needed for presenting additional content. In some embodiments, the prerecorded video experience container includes multiple executable experiences that are customized for presentation based on customization factors within the prerecorded video experience container and/or a user profile of the user operating the rendering electronic device. The described embodiments improve the efficiency and usefulness of interactive video content by providing a transportable prerecorded video experience container including the executable experience for presenting additional content related to the prerecorded video file.

Example Computer System and Mobile Electronic Device

Turning now to the figures, FIG. 1 is a block diagram of an example computer system 100 upon which embodiments of the present invention can be implemented. FIG. 1 illustrates one example of a type of computer system 100 (e.g., a computer system) that can be used in accordance with or to implement various embodiments which are discussed herein.

It is appreciated that computer system 100 of FIG. 1 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand alone computer systems, media centers, handheld computer systems, multi-media devices, and the like. In some embodiments, computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1 includes an address/data bus 104 for communicating information, and a processor 106A coupled with bus 104 for processing information and instructions. As depicted in FIG. 1, computer system 100 is also well suited to a multi-processor environment in which a plurality of processors 106A, 106B, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 106B, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 106B, and 106C. Computer system 100 also includes an cursor control device 116 coupled with bus 104 for communicating user input information and command selections to processor 106A or processors 106A, 106B, and 106C. In one embodiment, computer system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 2:
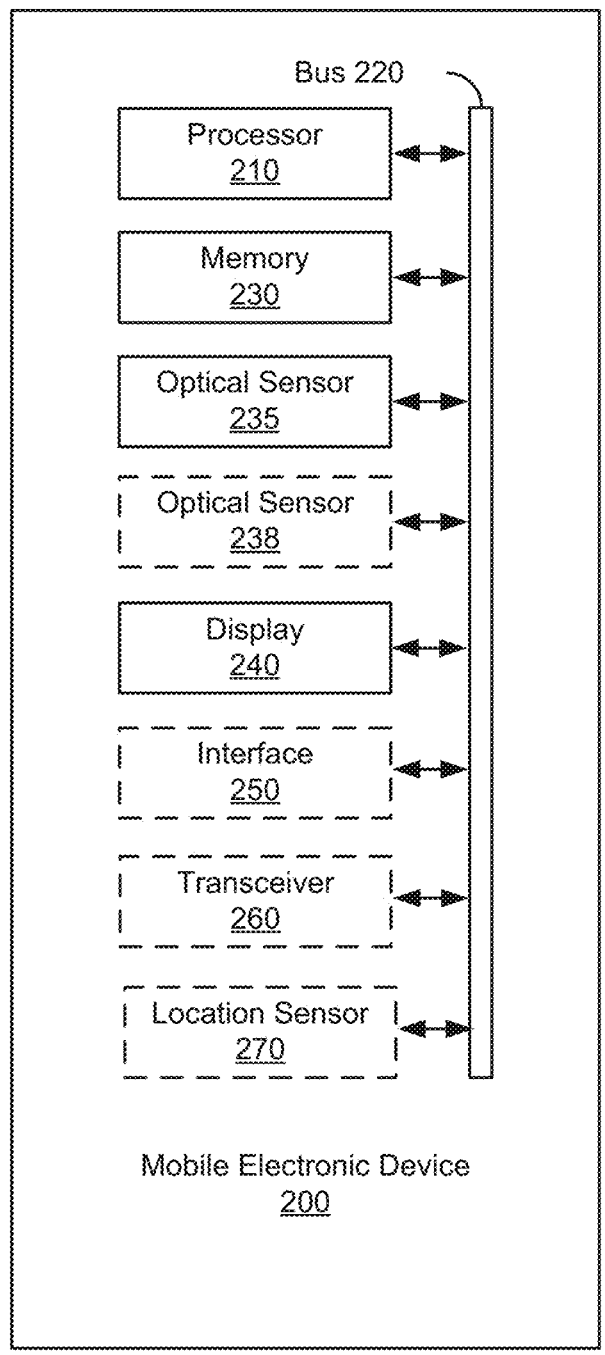
FIG. 2 illustrates an example mobile electronic device upon which embodiments described herein be implemented.

Turning now FIG. 2, a block diagram of an example mobile electronic device 200 is shown. As will be appreciated, mobile electronic device 200 may be implemented as a device or apparatus, such as a handheld mobile electronic device, that can be moved in space by a human user. That is, mobile electronic device 200 is small enough to be held in the hand of a human user, in various embodiments. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, a headset, or a combination of one or more of these devices.

As depicted in FIG. 2, mobile electronic device 200 may include a processor 210, a bus 220, a memory 230, at least one optical sensor 235, and a display 240. Some embodiments of mobile electronic device 200 may further include one or more of an interface 250, a transceiver 260 (all depicted in dashed lines), a location sensor 270, and/or other components. In various embodiments, electrical power for mobile electronic device 200 is provided by a mobile power source such as a battery, when not being actively charged.

Processor 210 can be one or more microprocessors, central processing units (CPUs), DSPs, general purpose microprocessors, ASICs, ASIPs, FPGAs or other processors which run software programs or applications, which may be stored in memory 230, associated with the functions and capabilities of mobile electronic device 200.

Bus 220 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-integrated Circuit (I2C) bus, a serial digital input output (SDIO) bus, a serial peripheral interface (SPI) or other equivalent. In the embodiment shown, processor 210, memory 230, display 240, interface 250, transceiver 260, and other components of mobile electronic device 200 may be coupled communicatively through bus 220 in order to exchange commands and data. Depending on the architecture, different bus configurations may be employed as desired. For example, additional buses may be used to couple the various components of mobile electronic device 200, such as by using a dedicated bus between processor 210 and memory 230.

Memory 230 can be any suitable type of memory, including but not limited to electronic memory (e.g., read only memory (ROM), random access memory, or other electronic memory), hard disk, optical disk, or some combination thereof. Multiple layers of software can be stored in memory 230 for use with/operation upon processor 210. For example, an operating system layer can be provided for mobile electronic device 200 to control and manage system resources in real time, enable functions of application software and other layers, and interface application programs with other software and functions of mobile electronic device 200. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 200, and in some of those embodiments, multiple applications can run simultaneously as part of the user experience system. In some embodiments, the user experience system, operating system, and/or the processor 210 may operate in a low-power mode (e.g., a sleep mode) where very few instructions are processed. Such a low-power mode may utilize only a small fraction of the processing power of a full-power mode (e.g., an awake mode) of the processor 210.

Optical sensor 235 may comprise, without limitation: a video capture device, a camera, and infrared camera, or other type of optical sensor for capturing a video of a person, an object, and/or a scene. It should be appreciated that mobile electronic device 200 may include more than one optical sensor. In one example, optical sensor 235 is a back-side optical sensor (e.g., rear-facing camera) and optical sensor 238 is a front-side optical sensor (e.g., front-facing camera).

Display 240, may be a liquid crystal device, (organic) light emitting diode device, or other display device suitable for creating and visibly depicting graphic images and/or alphanumeric characters recognizable to a user. Display 240 may be configured to output images viewable by the user and may additionally or alternatively function as a viewfinder for camera. Display 240 is configured to display video captured at optical sensor 235 (and optical sensor 238, when included).

Interface 250, when included, can be any of a variety of different devices providing input and/or output to a user, such as audio speakers, touch screen integrated with display 240, real or virtual buttons, joystick, slider, knob, printer, scanner, computer network I/O device, other connected peripherals and the like.

Transceiver 260, when included, may be one or more of a wired or wireless transceiver which facilitates receipt of data at mobile electronic device 200 from an external transmission source and transmission of data from mobile electronic device 200 to an external recipient. By way of example, and not of limitation, in various embodiments, transceiver 260 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Location sensor 270, when included, may be a sensor for determining a location of mobile electronic device 200, such as a navigation satellite system sensor such as a Global Navigation Satellite System (GNSS) receiver (e.g., Global Positioning System (GPS) sensor) a and/or other component configured to determine the location of mobile electronic device 200 from external radio signals. It is noted that the functionality of location sensor 270 may be implemented by processor 210.

Figure 3:
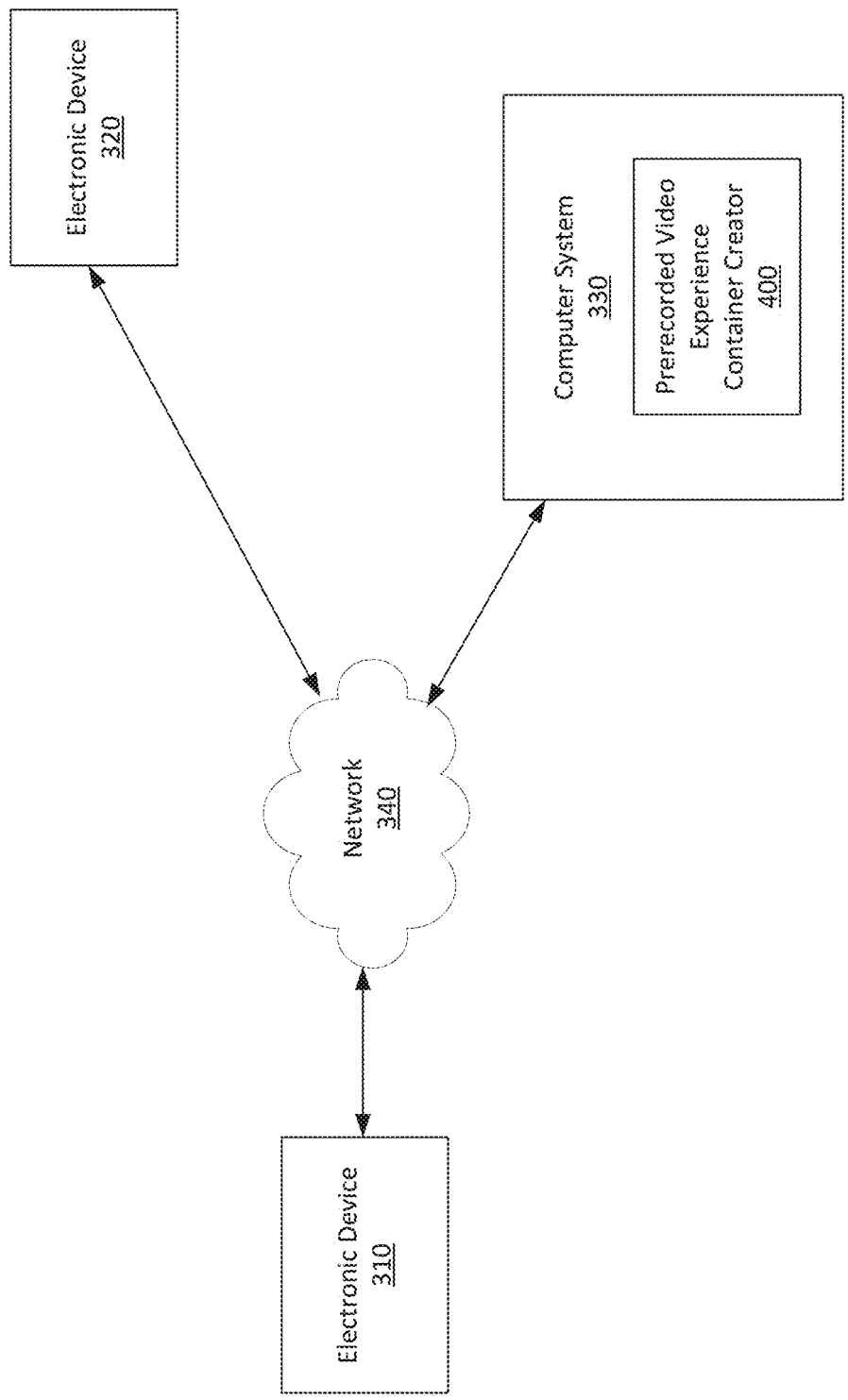
FIG. 3 illustrates an example network upon which embodiments described herein may be implemented.

FIG. 3 illustrates an example communication network 340 upon which embodiments described herein may be implemented. FIG. 3 illustrates electronic device 310, electronic device 320, and computer system 330, all of which are communicatively coupled via network 340. It should be appreciated that mobile electronic device 310, electronic device 320, and remote computer system 330, may be implemented as a computer system 100 or mobile electronic device 200, and/or include any combination of the components of computer system 100 or mobile electronic device 200. In some embodiments, mobile electronic device 310 and electronic device 320 are mobile electronic devices (e.g., smart phones) including messaging applications for communicating electronic messages via a graphical user interface.

In accordance with various embodiments, electronic devices 310 and 320 are capable of transmitting and receiving electronic messages including media files. Electronic devices 310 and 320 may be associated with a particular user. For example, a first user, may be associated with mobile electronic device 310 and a second user, may be associated with electronic device 320. In one embodiment, remote computer system 330 includes a prerecorded video experience container creator 400 for creating prerecorded video experience container.

Example Creation and Use of a Prerecorded Video Experience Container

Figure 4:
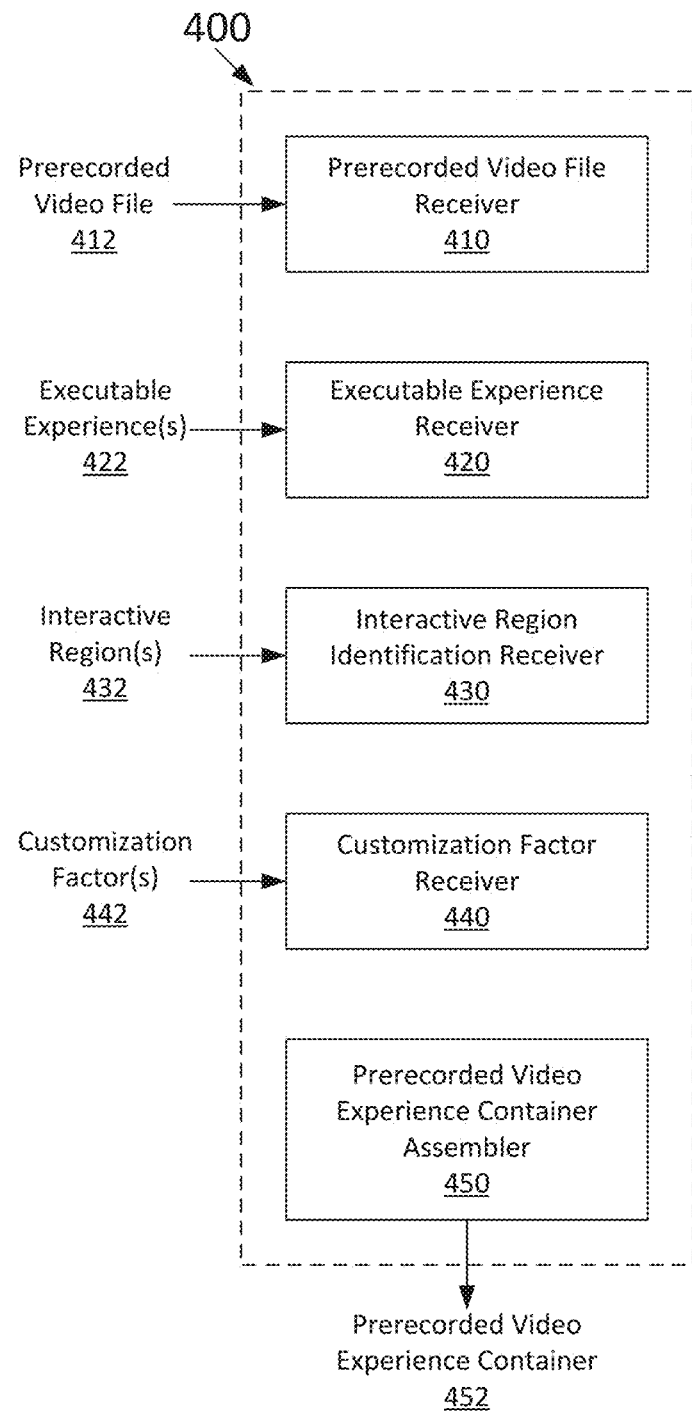
FIG. 4 illustrates a prerecorded video experience container creator, in accordance with various embodiments.

FIG. 4 illustrates a prerecorded video experience container creator 400, in accordance with various embodiments. Prerecorded video experience container creator 400 is configured to provide for the creation of prerecorded video experience containers. In one embodiment, prerecorded video experience container creator 400 includes prerecorded video file receiver 410, executable experience receiver 420, interactive region identification receiver 430, and prerecorded video experience container assembler 450. In some embodiments, prerecorded video experience container creator 400 also includes customization factor receiver 440.

It should be appreciated that prerecorded video experience container creator 400 can be implemented as hardware, software, or any combination thereof. For example, prerecorded video experience container creator 400 may be executed by computer system 100 of FIG. 1. In some embodiments, individual components of prerecorded video experience container creator 400 may be distributed over multiple computing devices. For example, with reference to FIG. 3, prerecorded video experience container creator 400 may access and/or receive different components of a prerecorded video experience container from remote computer systems communicatively coupled to network 340 (e.g., a library of prerecorded video files or a library of executable experiences).

Prerecorded video file receiver 410 is configured to receive a prerecorded video file 412 for displaying visual content. In some embodiments, the prerecorded video file 412 is received from a library of prerecorded video files (e.g., maintained by a service hosting prerecorded video files) over a network connection (e.g., network 340). In other embodiments, the prerecorded video file 412 is located on a local computer. It should be appreciated that the prerecorded video file 412 can be received from any source, and can have any creator. In some embodiments, the prerecorded video file 412 is a looping video file (e.g., automatically restarts after completing a playback). The looping functionality can be implemented within prerecorded video file 412 itself, within a prerecorded video experience container, or within another application on the playback device. Moreover, it should be appreciated that the prerecorded video file 412 can be any length. In some embodiments, e.g., where the prerecorded video file 412 is looping, the prerecorded video 412 file is less than 30 seconds in length.

In one embodiment, the prerecorded video file is a Graphics Interchange Format (GIF) file. While embodiments described herein pertain to GIF files, it should be appreciated that other types of prerecorded media files, such as other types of video files, can be used herein. Moreover, it should be appreciated that any type of video file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that the prerecorded media file can be looped (e.g., via a HTML 5 video element or Flash video element) to automatically repeat.

Executable experience receiver 420 is configured to receive one or more executable experiences 422 associated with the prerecorded video file 412. The executable experience(s) 422 provides for the presentation of additional content associated with the prerecorded video file 412. The executable experience 422 may include one or more media files, applications, instructions for executing an application, and instructions for controlling operation of an application. Example media files include, without limitation: video files, audio files, images, e-books, etc. Example applications include games, media players (e.g., for playing a media file of the executable experience), web applications, etc.

Example instructions for executing an application include instructions to execute a messaging application, a media player application, a web browser, etc. Example instructions for controlling operation of an application include commands for interacting with a media player, web application. It should be appreciated that the prerecorded video experience container can include any number of executable experiences 422 that are executable responsive to interactions with different interactive regions of the rendered prerecorded video file 412, or responsive to other customization factors.

An executable experience is executed in response to a user interaction with the prerecorded video file during playback. An interaction can include a cursor selection, a finger touch (e.g., at a touch screen display), gestures, etc. In some embodiments, at least one interactive region on the rendered prerecorded video file is defined and included within the prerecorded video experience container.

Interactive region identification receiver 430 is configured to receive information defining one or more interactive regions for receiving interactions with the prerecorded video file 412. An interaction can include a cursor selection, a finger touch (e.g., at a touch screen display), gestures, etc. In some embodiments, at least one interactive region on the rendered prerecorded video file is defined and included within the prerecorded video experience container. An interactive region overlays or is superimposed over the prerecorded video file 412 during playback and defines areas of the display for receiving the interactions. Any number of interactive regions can be defined for a prerecorded video file. In some embodiments, different interactive regions are for executing different executable experiences. An interactive region or regions can be superimposed over an entire rendered prerecorded video file, or an interactive region or regions can be superimposed over a portion of the rendered prerecorded video file, leaving non-interactive portions of the rendered prerecorded video file.

In some embodiments, prerecorded video experience container creator 400 also includes customization factor receiver 440. Customization factor receiver 440 is configured to receive at least one customization factor 442 for customizing the additional content upon execution of the executable experience. The customization factor 442 can include at least one of, without limitation: a location, a user, a time day, and a date. For instance, where a prerecorded video experience container includes more than one executable experience 422, a particular executable experience can be selected for presentation partly based on the customization factor 442. For example, a particular executable experience can be presented based on a time of day (e.g., based on a system clock of the rendering electronic device). A prerecorded video experience container can include two prerecorded video files, one for rendering during a first time period (e.g., 9:00 AM through 5:00 PM), and a second for rendering during a second time period (e.g., 5:00 PM through 9:00 AM). The customization factors can be used to tailor the presentation of additional content according to day, date, time, location, users, etc.

In some embodiments, the executable experience 422 is tailored by accessing a user profile of the user operating the rendering electronic device. The user profile can stored on the electronic device, or accessed via the electronic device. The user profile can include various types of identifying information of various granularities, including without limitation: age, birthdate, gender, interests, race/ethnicity, language spoken/understood, etc. In various embodiments, a prerecorded video experience container can include a plurality of executable experiences, where an interaction with the prerecorded video file causes presentation of one of the executable experiences based on the user profile.

Prerecorded video experience container assembler 450 is configured to assemble prerecorded video file 412, one or more exactable experiences 422, and one or more interactive region identifications 432 into a prerecorded video experience container 452. In one embodiment, prerecorded video experience container assembler 450 is also configured to include the customization factors 442 into prerecorded video experience container 452.

Figure 5:
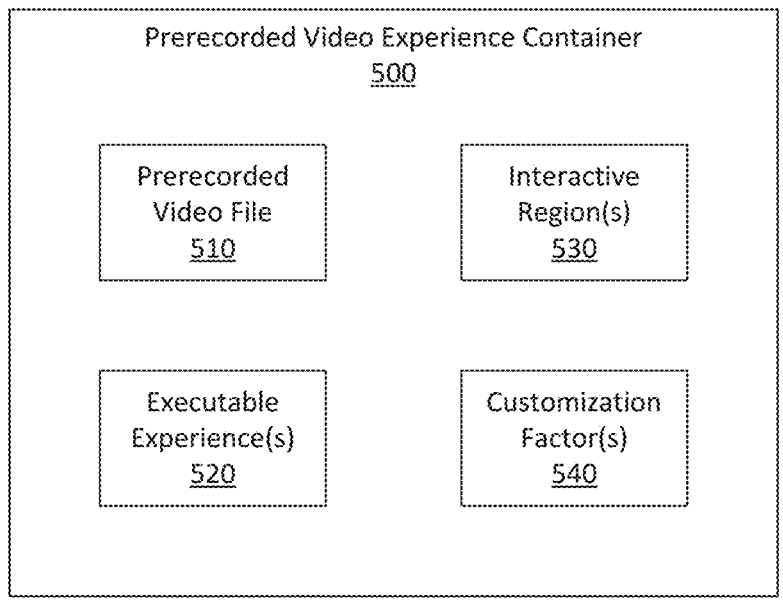
FIG. 5 illustrates a prerecorded video experience container, in accordance with various embodiments.

FIG. 5 illustrates a prerecorded video experience container 500, in accordance with various embodiments. Prerecorded video experience container 500 includes a prerecorded video file 510 that displays visual content, an executable experience 520 which upon execution enables presentation of additional content associated with the prerecorded video file 510, and an interactive region 530 of the prerecorded video file 510, wherein the interactive region 530 of the prerecorded video file 510 is associated with the executable experience 520 such that a user interaction with the interactive region 530 executes the executable experience 520. The prerecorded video file 510 is displayed in response to a selection of the prerecorded video experience container 500. The executable experience 520 associated with the prerecorded video file 510 is executed in response to identifying an interaction with the interactive region 530. The additional content associated with the prerecorded video file 510 is displayed in response to executing the executable experience.

Embodiments described herein provide a prerecorded video experience container 500 that is self-contained and transmittable. The prerecorded video experience container 500 includes all information needed for presenting additional content. In some embodiments, the prerecorded video experience container 500 includes multiple executable experiences 520 that are customized for presentation based on customization factors 540 within the prerecorded video experience container 500 and/or a user profile of the user operating the rendering electronic device. The described embodiments improve the efficiency and usefulness of interactive video content by providing a transportable prerecorded video experience container including the executable experience for presenting additional content related to the prerecorded video file.

FIGS. 6A through 6F illustrate example screenshots of rendered prerecorded video files and defined interactive regions of prerecorded video experience containers, according to various embodiments. For example, FIGS. 6A through 6F may illustrate a view presented to a creator of a prerecorded video experience container during creation of the container. Using a graphical user interface, the creator may define one or more interactive regions for receiving a user interaction. It should be appreciated that an interaction is defined by the particular device or computer system with which a viewer is interacting (e.g., a touch screen on a smart phone or a mouse click with a desktop computer). FIGS. 6A through 6F also illustrate example screenshots of rendered prerecorded video files as presented to a user, where the interactive region is defined yet not visible.

Figure 6A:
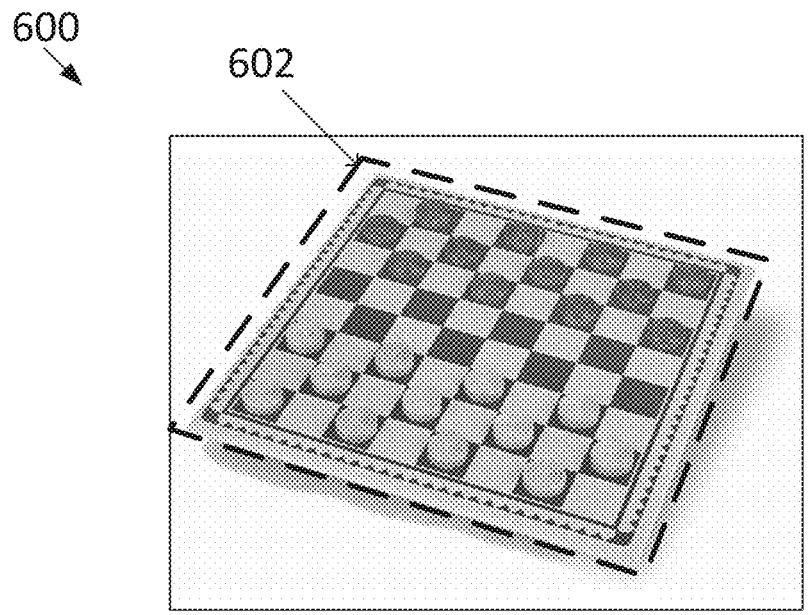
FIGS. 6A through 6F illustrate example screenshots of rendered prerecorded video files and defined interactive regions of prerecorded video experience containers, according to various embodiments.

With reference to FIG. 6A, prerecorded video file 600 is displayed, where prerecorded video file shows a video of a game of checkers being played. Interactive region 602 is defined, such that a user interaction with interactive region 602 causes the execution of an executable experience related to prerecorded video file 600. For example, the executable experience may include a checkers video game that is executed in response to detecting the user interaction. In one embodiment, the checkers video game is a self-contained executable included within the prerecorded video experience container along with prerecorded video file 600 and defined interactive region 602.

Figure 6B:
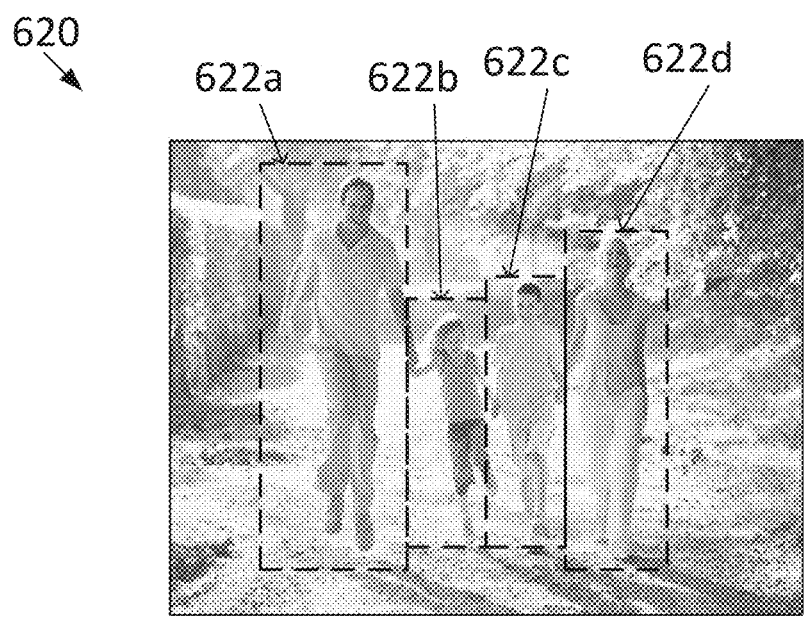

FIG. 6B illustrates a screen shot of prerecorded video file 620, where prerecorded video file shows a video of a family walking down a dirt road. Interactive regions 622a-d are defined, where each interactive region 622a-d is associated with a particular family member. Interaction with one of interactive regions 622a-d causes the execution of an executable experience associated with prerecorded video file 620 and associated with the selected interactive region. For example, the executable experience may include automatically initiating a voice or messaging application with the person identified by the particular interactive region. For instance, a user interaction with interactive region 622d can open up a messaging application (e.g., Facetime or iMessage) and automatically initiate a call or message with the person identified by interactive region 622d.

Figure 6C:
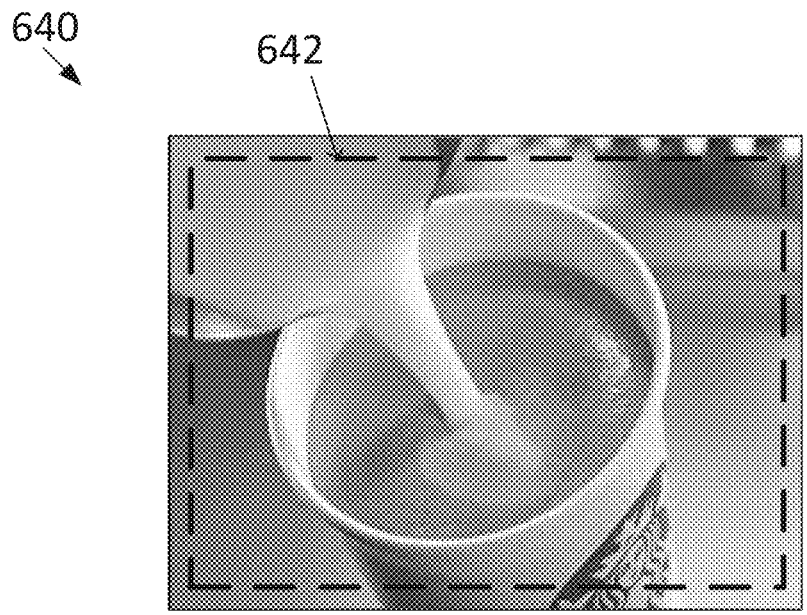

FIG. 6C illustrates a screen shot of prerecorded video file 640, where prerecorded video file shows a video of the making of a coffee-related beverage. Interactive region 642 is defined. Interaction with interactive regions 642 causes the execution of an executable experience related to prerecorded video file 640. For example, the executable experience may include presenting a coupon for a coffee-related beverage at particular store, presenting a video on the making of coffee, or a video game that presents a coupon redeemable at a particular store depending on the user's performance in the video game.

In some embodiments, the prerecorded video experience container including prerecorded video file 640 includes at least one defined customization factor. For example, if an interaction with interactive region 642 is detected during business hours of a business associated with the prerecorded video file 640, a coupon is presented, where if an interaction with interactive region 642 is detected outside of business hours of the business associated with the prerecorded video file 640, a video on the making of coffee is presented. As such, the prerecorded video experience container includes different executable experiences that are initiated depending, at least in part, on a customization factor.

Figure 6D:
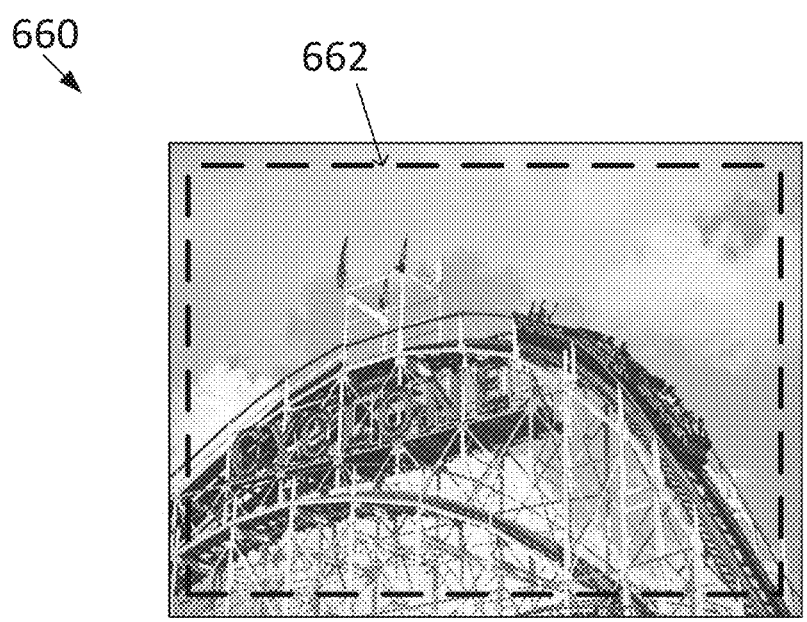

FIG. 6D illustrates a screen shot of prerecorded video file 660, where prerecorded video file shows a video of roller coaster at a theme park. Interactive region 662 is defined. Interaction with interactive regions 662 causes the execution of an executable experience related to prerecorded video file 660. For example, the executable experience may include presenting a coupon for the theme park, executing a video game associated with roller coasters, presenting a video about the theme park, etc.

Figure 6E:
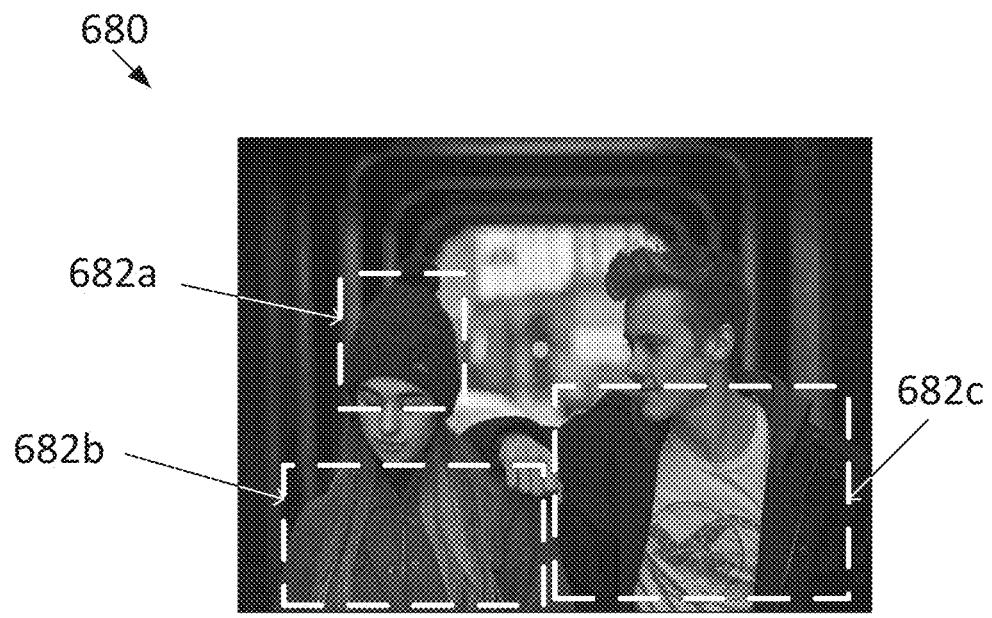

FIG. 6E illustrates a screen shot of prerecorded video file 680, where prerecorded video file shows a video of two young adults wearing trendy clothing. Interactive regions 682a-c are defined, where each interactive region 682a-c is associated with a particular item of clothing. Interaction with one of interactive regions 682a-c causes the execution of an executable experience associated with prerecorded video file 680 and associated with the selected interactive region. For example, the executable experience may include automatically presenting information (e.g., opening a web page, opening a shopping application, etc.) for purchasing the selected item of clothing. For instance, a user interaction with interactive region 682a can open up an application enabling purchase of the selected hat.

Figure 6F:
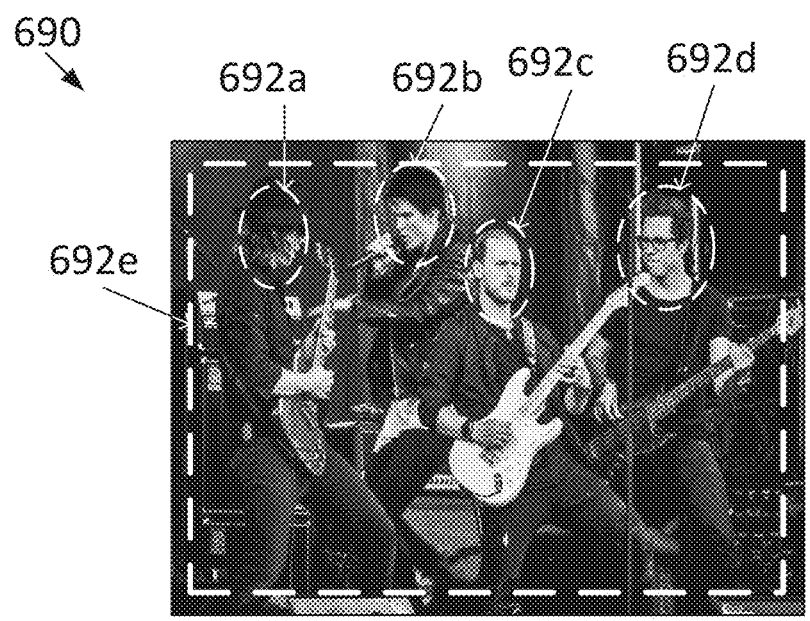

FIG. 6F illustrates a screen shot of prerecorded video file 690, where prerecorded video file shows a video of a rock band performing. Interactive regions 692a-e are defined, where each interactive region 692a-e is associated with a selectable region. Specifically, interactive regions 692a-d are associated with particular band members, and interactive region 692e is associated with the whole band. Interaction with one of interactive regions 692a-e causes the execution of an executable experience associated with prerecorded video file 690 and associated with the selected interactive region. For example, the executable experience may include automatically presenting information about the selected band member (e.g., a biographical video or an interview) or band (open an application for purchasing concert tickets for the band). In another example, interaction with interactive region 692e causes the execution of different executable experiences based on a customization factor (e.g., location). If the location of the user device is physically and temporally proximate a performance by the band (as defined by the creator of the prerecorded video experience container), an application for purchasing a ticket to the performance is presented. Alternatively, if the user device is not located near a future performance, a video of the band performing can be presented. In the present example, the instructions for purchasing tickets to the performance and the video are included within the prerecorded video experience container.

Figure 7:
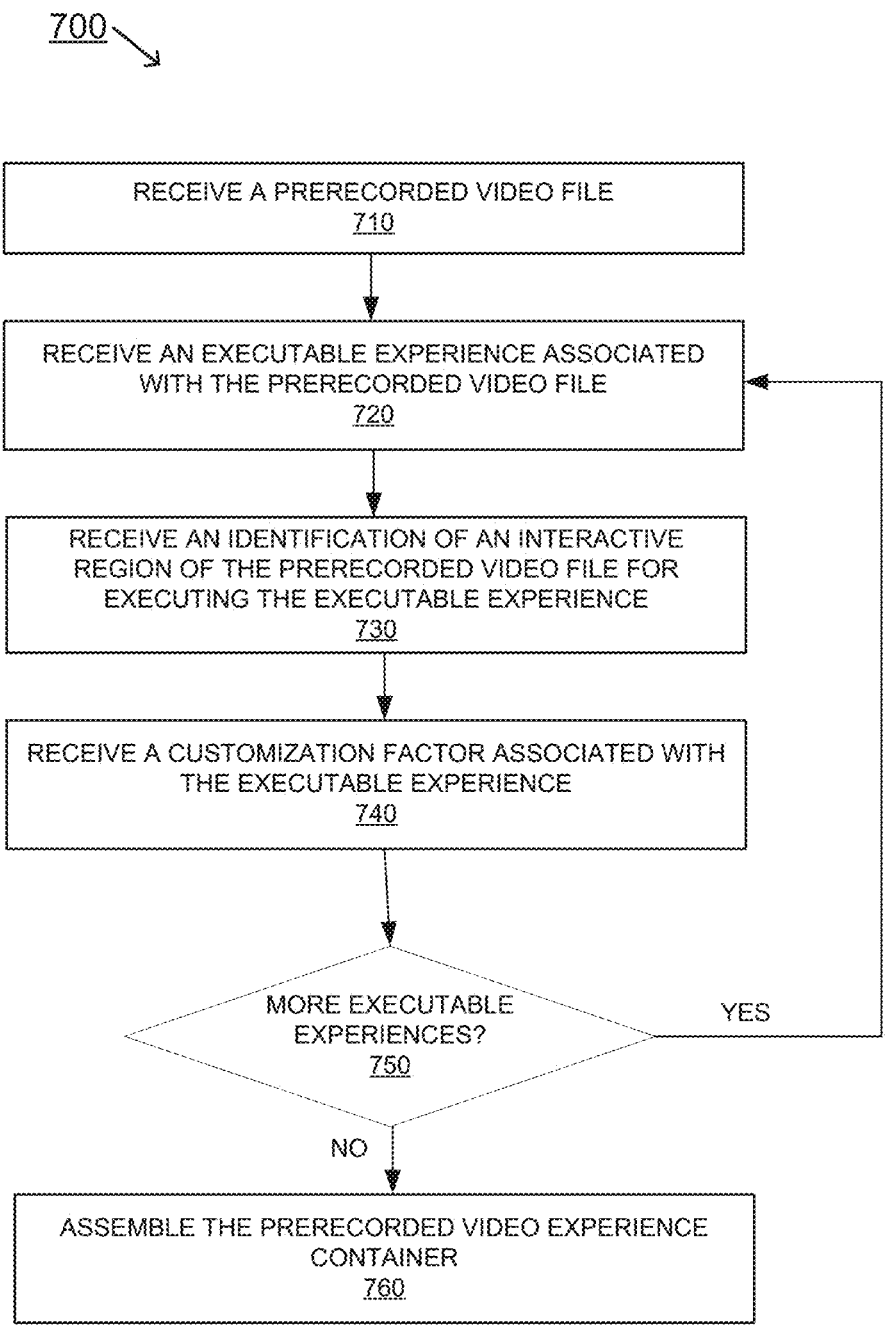
FIG. 7 illustrates a flow diagram of an example method for creating a prerecorded video experience container, according to various embodiments.

Example Methods of Operation of Creating and Using a Prerecorded Video Experience Container FIG. 7 illustrates a flow diagram 700 of an example method for creating a prerecorded video experience container, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors under the control of computer-readable and computer-executable instructions that are stored on non-transitory computer-readable storage media. It is further appreciated that one or more procedures described in flow diagram 700 may be implemented in hardware, or a combination of hardware with firmware and/or software.

As shown at procedure 710 of flow diagram 700, a prerecorded video file that displays visual content is received. In one embodiment, the prerecorded video file is a short form prerecorded video file. In one embodiment, the prerecorded video file is a looping prerecorded video file.

At procedure 720, an executable experience associated with the prerecorded video file is received, wherein the executable experience upon execution enables presentation of additional content associated with the prerecorded video file. In one embodiment, the executable experience comprises an application. In one embodiment, the executable experience comprises a media file. In one embodiment, the executable experience comprises an instruction for executing an application located on the electronic device upon which the prerecorded video file is rendered.

At procedure 730, an identification of an interactive region of the prerecorded video file is received, wherein the interactive region of the prerecorded video file is associated with the executable experience such that a user interaction with the interactive region executes the executable experience.

In some embodiments, as shown at procedure 740, at least one customization factor associated with the executable experience is received, wherein the at least one customization factor customizes the additional content upon execution of the executable experience. In some embodiments, the at least one customization factor comprises at least one of: a location, a user, a time day, and a date.

In some embodiments, the prerecorded video experience container includes more than one executable experience. As shown at procedure 750, it is determined whether there are additional executable experiences to include within the prerecorded video experience container. If it is determined that there are more executable experiences to include within the prerecorded video experience container (e.g., as indicated by a creator of the prerecorded video experience container), flow diagram 700 proceeds to procedure 720. If it is determined that there are no more executable experiences to include within the prerecorded video experience container (e.g., as indicated by a creator of the prerecorded video experience container), flow diagram 700 proceeds to procedure 760.

At procedure 760, the prerecorded video file, the executable experience(s), and the interactive region(s), are assembled into a prerecorded video experience container, wherein the prerecorded video experience container, when executed at an electronic device, displays the prerecorded video file and, responsive to identifying an interaction with the interactive region, executes the executable experience. In some embodiments, the at least one customization factor is also assembled into the prerecorded video experience container.

Figure 8:
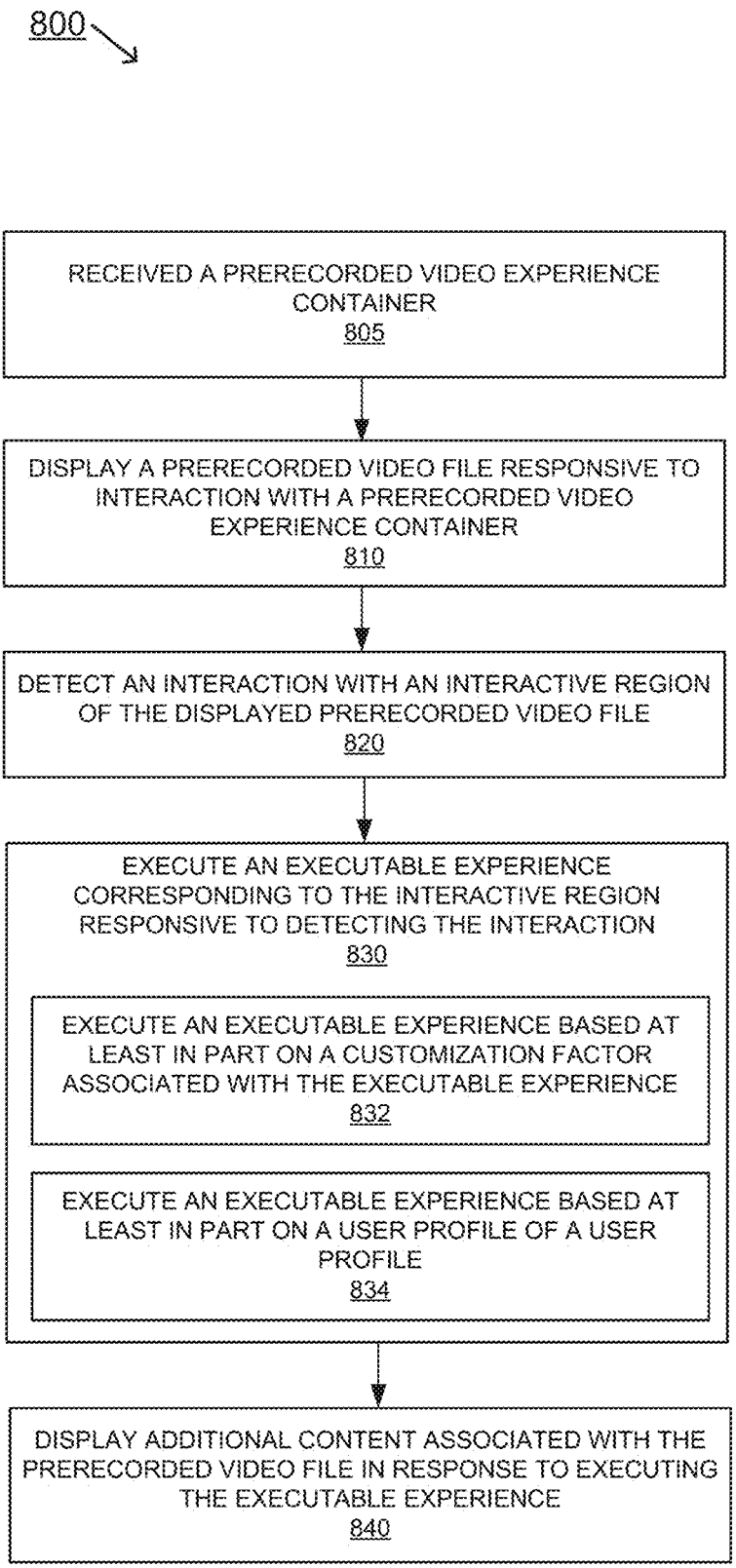
FIG. 8 illustrates a flow diagram of an example method for executing a prerecorded video experience container, according to various embodiments.

FIG. 8 illustrates a flow diagram 800 of an example method for creating a prerecorded video experience container, according to various embodiments. Procedures of this method may be described with reference to elements and/or components of various figures described herein. It is appreciated that in some embodiments, the procedures may be performed in a different order than described, that some of the described procedures may not be performed, and/or that one or more additional procedures to those described may be performed. Flow diagram 800 includes some procedures that, in various embodiments, are carried out by one or more processors under the control of computer-readable and computer-executable instructions that are stored on non-transitory computer-readable storage media. It is further appreciated that one or more procedures described in flow diagram 800 may be implemented in hardware, or a combination of hardware with firmware and/or software.

As shown at procedure 805 of flow diagram 800, in one embodiment, a prerecorded video experience container is received. In one embodiment, the prerecorded video experience container is received via a messaging application. In one embodiment, the prerecorded video experience container is received via accessing a web site (e.g., the prerecorded video experience container is integrated into the website via an Iframe).

At procedure 810, a prerecorded video file is displayed responsive to an interaction with prerecorded video experience container (e.g., a user selection of the prerecorded video experience container). In one embodiment, the prerecorded video file is a short form prerecorded video file. In one embodiment, the prerecorded video file is a looping prerecorded video file.

At procedure 820, an interaction with an interactive region of the displayed prerecorded video file is detected. It should be appreciated that there can be more than one interactive region of the prerecorded video file.

At procedure 830, an executable experience associated with the prerecorded video file and corresponding to the interactive region is executed. In one embodiment, as shown at procedure 832, the executable experience is executed based at least in part on a customization factor associated with the executable experience. In one embodiment, as shown at procedure 834, the executable experience is executed based at least in part on a user profile of a user interacting with the prerecorded video file.

At procedure 840, additional content associated with the prerecorded video file is displayed in response to executing the executable experience.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method, executed by one or more processors of a mobile computing device including a display, comprising:
   receiving a prerecorded video file for displaying visual content; the prerecorded video file including an identification of an interactive region of the prerecorded video file and a customization factor defining a location for execution of an executable experience associated with the prerecorded video file;
   displaying the prerecorded video file on the display;
   receiving user selection of the interactive region;
   executing a first executable experience on the mobile computing device based on a first determination that the mobile computing device is proximate the location defined by the customization factor; and
   executing a second executable experience on the mobile computing device based on a second determination that the mobile computing device is not proximate the location defined by the customization factor.

2. The method of claim 1 wherein the location is the location of an event and executing the first executable experience presents an application for purchasing a ticket to the event.

3. The method of claim 2 wherein executing the second executable experience comprises presenting video related to the event.

4. The method of claim 1 wherein the location is a business and executing the first executable experience presents a coupon that is redeemable at the business.

5. The method of claim 1 wherein one or both of the first and second executable experiences comprises instructions relating to an application stored on the mobile computing device.

6. The method of claim 1 further comprising:
customizing one or both of the first and second executable experiences according to a user profile of a user operating the mobile computing device.

7. The method of claim 1 wherein one or both of the first and second executable experiences comprise a media file.

8. The method of claim 1 wherein the customization factor further includes at least one of a time of day, a day or a date.

9. A non-transitory computer readable storage medium having computer readable program code stored thereon for causing a mobile computing device including a display to perform a method comprising:
receiving a prerecorded video file for displaying visual content, the prerecorded video file including an identification of an interactive region of the prerecorded video file and a customization factor defining a location for execution of an executable experience associated with the prerecorded video file;
displaying the prerecorded video file on the display;
receiving user selection of the interactive region;
executing a first executable experience on the mobile computing device based on a first determination that the mobile computing device is proximate the location defined by the customization factor; and
executing a second executable experience on the mobile computing device based on a second determination that the mobile computing device is not proximate the location defined by the customization factor.

10. The non-transitory computer readable storage medium of claim 9 wherein the location is the location of an event and executing the first executable experience presents an application for purchasing a ticket to the event.

11. The non-transitory computer readable storage medium of claim 10 wherein executing the second executable experience comprises presenting video related to the event.

12. The non-transitory computer readable storage medium of claim 9 wherein the location is a business and executing the first executable experience presents a coupon that is redeemable at the business.

13. The non-transitory computer readable storage medium of claim 9 wherein one or both of the first and second executable experiences comprises instructions relating to an application stored on the mobile computing device.

14. The method of claim 1 further comprising:
customizing one or both of the first and second executable experiences according to a user profile of a user operating the mobile computing device.

15. The method of claim 1 wherein one or both of the first and second executable experiences comprise a media file.

16. The method of claim 1 wherein the customization factor further includes at least one of a time of day, a day or a date.

17. A mobile computing device comprising:
one or more processors;
a display; and
a memory storing instructions for providing prerecorded video experience to a user of the mobile computing device, the instructions when executed by at least one processor among the one or more processors, causes the mobile computing device to perform operations comprising:
receiving a prerecorded video file for displaying visual content, the prerecorded video file including an identification of an interactive region of the prerecorded video file and a customization factor defining a location for execution of an executable experience associated with the prerecorded video file;
displaying the prerecorded video file on the display;
receiving user selection of the interactive region;
executing a first executable experience on the mobile computing device based on a first determination that the mobile computing device is proximate the location defined by the customization factor; and
executing a second executable experience on the mobile computing device based on a second determination that the mobile computing device is not proximate the location defined by the customization factor.

18. The mobile computing device of claim 17 wherein the location is the location of an event and executing the first executable experience presents an application for purchasing a ticket to the event.

19. The mobile computing device of claim 18 wherein executing the second executable experience comprises presenting video related to the event.

20. The mobile computing device of claim 17 wherein the location is a business and executing the first executable experience presents a coupon that is redeemable at the business.

* * * * *